United States Patent
Sasaki

[11] Patent Number: 5,956,433
[45] Date of Patent: Sep. 21, 1999

[54] METHOD AND DEVICE FOR REMOVING SPOTS FROM A CHARACTER IMAGE IN AN OPTICAL CHARACTER READER

[75] Inventor: Hisashi Sasaki, Yokohama, Japan

[73] Assignee: Fujitsu Limited, Kawasaki, Japan

[21] Appl. No.: 08/820,382

[22] Filed: Mar. 18, 1997

Related U.S. Application Data

[63] Continuation of application No. 08/268,924, Jun. 30, 1994, abandoned.

[30] Foreign Application Priority Data

Oct. 7, 1993 [JP] Japan .................................. 5-251803

[51] Int. Cl.[6] .............................. G06K 9/36; G06F 15/00
[52] U.S. Cl. ......................... 382/275; 382/168; 382/177; 382/178; 395/101; 395/131
[58] Field of Search ..................................... 395/109, 110, 395/131, 101; 382/275, 257, 317, 194, 177, 178, 168

[56] References Cited

U.S. PATENT DOCUMENTS

| | | | |
|---|---|---|---|
| 4,741,045 | 4/1988 | Denning | 382/275 |
| 4,747,149 | 5/1988 | Umeda et al. | 382/194 |
| 5,335,086 | 8/1994 | Kitamura | 382/275 |
| 5,418,865 | 5/1995 | Bloomberg | 382/317 |

*Primary Examiner*—Andrew W. Johns
*Assistant Examiner*—Monica S. Davis
*Attorney, Agent, or Firm*—Staas & Halsey

[57] ABSTRACT

A method and apparatus for removing spots from character images of a multi-character image read by an image scanner. A character image is cut out from the multi-character image. Separated segments in the cut-out character image are then detected. A respective segment of the detected, separated segments is deleted as a free spot if the number of detected segments exceeds a maximum segment number. After deleting a free spot, an attempt is then made to recognize a character in the character image. When a character cannot be recognized, a black pixel width is identified by analyzing the distribution of black pixel widths in the character image. Then, a circumscribed rectangle is defined in accordance with the identified black pixel width. Pixels of images lying outside the circumscribed rectangle are deleted from the character image as an externally contacted spot.

13 Claims, 13 Drawing Sheets

P : DETECTION POINT
①~⑧ : CHECK POSITION

Fig.10(A)

| | NUMBER OF SEGMENTS TO BE LEFT AS A HANDWRITTEN CHARACTER IMAGE | TYPE OF CHARACTER (EXAMPLE) |
|---|---|---|
| NUMERAL | 1 | 0～9 |
| ALPHABET | 2 | A～Z |
| NUMERICAL SYMBOL | 1 | －, ＋, . , ￥, ×, E |
| ALPHABETIC SYMBOL | 3 | *, +, －, =, etc |
| KANA CHARACTER | 3 | ア～ン, 「, 」, etc |

Fig.10(B)

| | NUMBER OF SEGMENTS TO BE LEFT AS A TYPESCRIPT CHARACTER IMAGE | TYPE OF CHARACTER |
|---|---|---|
| NUMERAL | 1 | 0～9 |
| ALPHABET | 1 | A～Z |
| NUMERICAL SYMBOL | 1 | － |
| ALPHABETIC SYMBOL | 3 | *, +, －, =, etc |
| KANA CHARACTER | 3 | ア～ン, －, etc |

LATERAL LINES

| BLACK PIXEL WIDTH \ LINE NUMBER | 1 | 2 | 3 | 4 | 5 | 6 | 7 | 8 | 9 | 10 | ~ I | H |
|---|---|---|---|---|---|---|---|---|---|---|---|---|
| 0~S | 0 | 0 | 0 | 0 | 0 | 0 | 0 | 0 | 0 | 0 | ~ | 0 |
| S~2S | 0 | 0 | 0 | 0 | 0 | 0 | 0 | 0 | 0 | 0 | ~ | 0 |
| 2S~3S | 1 | 1 | 1 | 2 | 2 | 2 | 2 | 2 | 1 | 0 | ~ | 0 |
| 3S~3S | 0 | 0 | 0 | 0 | 0 | 0 | 0 | 0 | 0 | 0 | ~ | 0 |
| ~ | ~ | ~ | ~ | ~ | ~ | ~ | ~ | ~ | ~ | ~ | ~ | ~ |
| mS~W | 0 | 0 | 0 | 1 | 1 | 1 | 1 | 1 | 0 | 0 | ~ | 1 |

Fig.12(B)

VERTICAL LINES

| BLACK PIXEL WIDTH \ LINE NUMBER | 1 | 2 | 3 | 4 | 5 | 6 | 7 | 8 | 9 | 10 | ~ I | W |
|---|---|---|---|---|---|---|---|---|---|---|---|---|
| 0~S | 0 | 0 | 0 | 0 | 0 | 0 | 0 | 0 | 0 | 0 | ~ | 0 |
| S~2S | 0 | 0 | 0 | 0 | 0 | 0 | 0 | 0 | 0 | 0 | ~ | 0 |
| 2S~3S | 0 | 0 | 1 | 2 | 2 | 2 | 2 | 2 | 1 | 0 | ~ | 0 |
| 3S~3S | 0 | 0 | 0 | 0 | 0 | 0 | 0 | 0 | 0 | 0 | ~ | 0 |
| ~ | ~ | ~ | ~ | ~ | ~ | ~ | ~ | ~ | ~ | ~ | ~ | ~ |
| nS~H | 0 | 0 | 0 | 1 | 1 | 1 | 1 | 1 | 0 | 0 | ~ | 0 |

Fig.13

METHOD AND DEVICE FOR REMOVING SPOTS FROM A CHARACTER IMAGE IN AN OPTICAL CHARACTER READER

This application is a continuation of application Ser. No. 08/268,924, filed Jun. 30, 1994, now abandoned.

BACKGROUND OF THE INVENTION

1. Field of the Invention

The present invention relates to a system for removing spots from a character image. More specifically, the present invention removes noise resulting from optical character recognition in an optical character reader for reading duplicate slips.

In recent years, an optical character reader has been available for reading characters from various kinds of slips. It is, however, essential that an input slip image does not contain spots resulting from stains or erasure residue. As is the case with a slip duplicated by a non-carbon copying paper (that is, a slip including multifarious spots), recognition precision deteriorates.

2. Description of the Related Art

Figure 1:
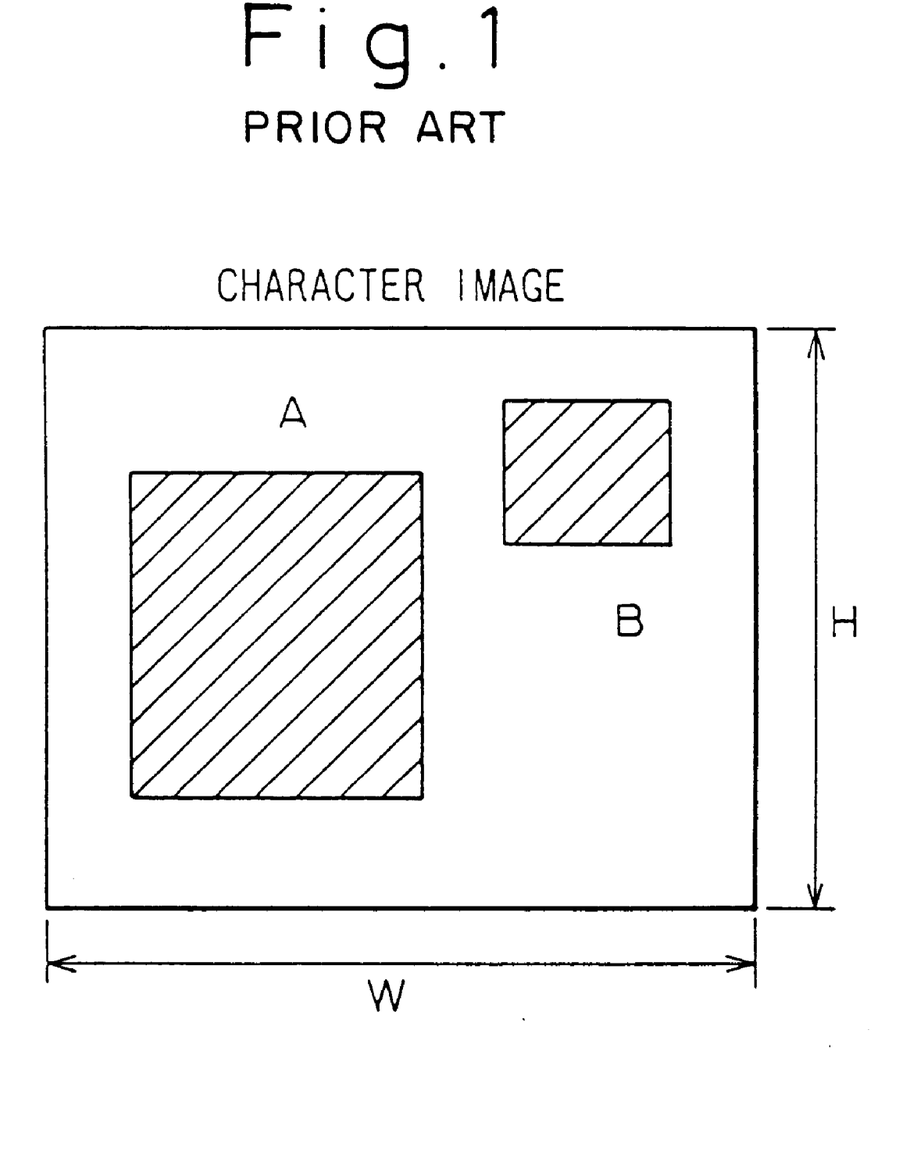
FIG. 1 is an explanatory diagram concerning a prior art.

A conventional optical character reader can detect free or liberated spot (resulting from a stain) in a character image and delete the spot while reading a slip. The procedure will be described in conjunction with an explanatory diagram of FIG. 1 showing a prior art. In FIG. 1, a symbol A denotes a character image read by an optical character reader. An image is formed by pixels within a frame range defined by a height (H) and a width (W). The image contains masses of black pixels, A and B. Flags are assigned to the respective black pixels belonging to the large mass A and small mass B, respectively. It is then checked if the flags are connected mutually. As a result, it is recognized that the masses A and B are separated from each other. Thereafter, the number of masses is compared with a value predetermined relative to a type of characters to be read. If the number of blocks exceeds the predetermined value, the smaller one of the separated masses (that is, mass B) is deleted as a spot. Alternatively, character recognition is performed (according to a conventional method such as pattern matching) to see if a character is recognized in the character image including the masses A and B. If no character is recognized in the mass B, the mass B is deleted as a spot.

In recent years, there has been an increasing demand for reading of slips duplicated by non-carbon copying paper. However, duplicate slips are liable to bend or develop a color by a strong touch. The duplicate slips therefore always contain a spot (the spot results from stains or the like, which is the case true for the following description). Thus, an optical character reader has a problem maintaining satisfactory recognition precision due to the spot.

In other words, free spots or spots incidental to a character image by a cut-out or partitioned method can be suppressed to some extent owing to the aforesaid prior art. However, spots in contact with an original character image cannot be deleted.

SUMMARY OF THE INVENTION

An object of the present invention is to provide a method and device for removing spots from a character image in an optical character reader in which not only spots free from an original character in a duplicate slip are removed but also spots in contact with the character can be removed in order to offer improved precision in character recognition.

In accordance with an aspect of the present invention, there is provided a method for removing a spot from a character image in an optical character reader comprising the steps of:

cutting out one character of a character image from an image acquired by reading a document using an image scanner;

detecting a number of separated segments in the cut-out character image;

determining a segment to be deleted as free spots, if the number of detected segments exceeds an amount which is predetermined by another character (attribute) to be read, to delete them as free spots;

recognizing a character in the character image from which said free spots free-wheeled has been deleted;

identifying, if the recognition fails, a typical line width or black pixel width, by analyzing the distribution of the black pixel widths in the character image;

defining a circumscribed rectangle formed by the typical black pixel width; and deleting pixels of images lying outside the circumscribed rectangle from the character image, to remove externally contacted spot.

In accordance with another aspect of the present invention, there is provided a device for removing a spot from a character image in an optical character reader, wherein a character reader for recognizing characters comprises: a character cutout unit for cutting out a character image of one character from an image read by an image scanner; a segmenting unit for detecting segments (masses) constructing one cut-out character image; a free spot deleting unit that when the number of detected segments exceeds a value predetermined for a type of character to be read, deletes segments regarded as a spot; a character recognition unit for recognizing a character in a character image from which the free spot has been deleted; and an externally contacted spot deleting means being activated when the character recognition fails, for identifying a typical black pixel width by measuring black pixel widths in the character image, and deleting external by contacted spot using a circumscribed rectangle defined with black pixels having the typical black pixel width.

According to the present invention, when an optical character reader reads a slip duplicated by non-carbon copying paper, after a spot (resulting from a stain) contained in the input slip image is removed from each character image, character recognition is executed. This contributes to improvement in recognition precision.

DESCRIPTION OF THE PREFERRED EMBODIMENT

Figure 2:
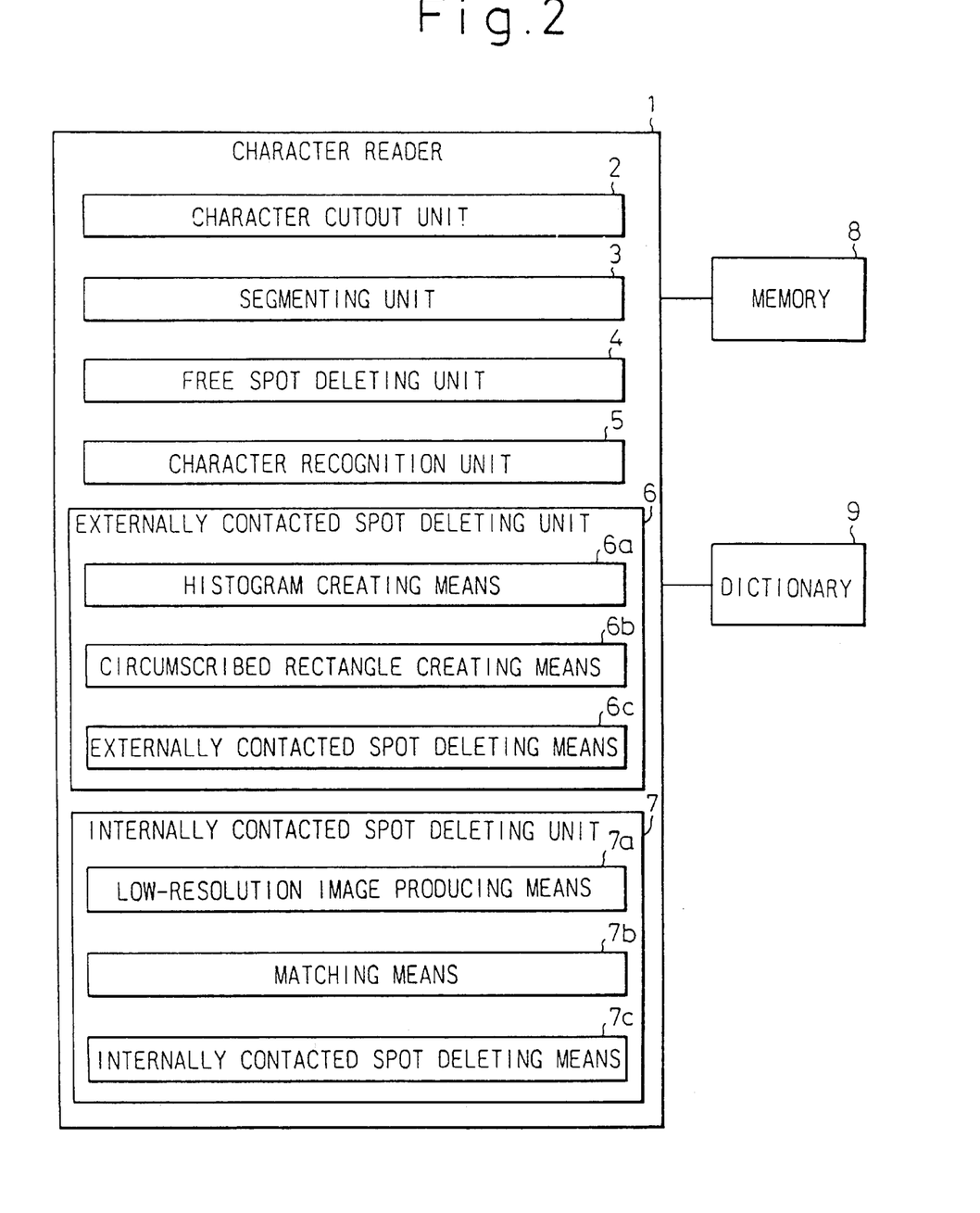
FIG. 2 shows the principles and configuration of the present invention.

FIG. 2 is a block diagram showing the structure and the functional constitution of an optical character recognition device in accordance with the present invention.

FIGS. 3A to 3E are views showing an original character image and a process for excluding free spots and contacted spots in accordance with the present invention.

In FIG. 2, reference numeral 1 denotes a character reader for reading characters while removing a spot from each character image optically read by an optical character reader, 2 denotes a character cutout unit, 3 denotes a segmenting unit, 4 denotes a free spot deleting unit, 5 denotes a character recognition unit, 6 denotes an externally contacted spot deleting unit, 7 denotes an internally contacted spot deleting unit, 8 denotes a memory, and 9 denotes a dictionary for storing character recognition patterns.

According to the present invention, a character image produced by reading characters from a duplicate slip or the like is segmented in order to remove a free spot and to attempt character recognition. If recognition does not proceed normally, externally contacted spots that are externally in contact with a character are removed by creating histograms specifying the widths of black pixels in the character image and detecting a typical black pixel width. A low-resolution image of the character image is created and collated with character patterns stopped in a dictionary, and a character pattern most analogous to the low-resolution image is detected in the dictionary. A low-resolution pattern of the character pattern is used to remove internally contacted. spots, and then a character is recognized.

Referring to FIGS. 3A to 3E, the mode of operation shown in FIG. 2 will be described. An optical scanner, which is not shown, is used to read a slip. A read image containing characters is stored in a memory 8 in a character reader 1. Thereafter, a character cutout unit 2 in the character reader 1 cuts out a character image made up of dots representing white and black pixels for one character. Here, it is assumed that the cut-out character image has the contents shown as FIG. 3B. Reference 1 in FIG. 3B denotes an original character image without spot and is identical to that shown in FIG. 3A (the character image is not illustrated as any specific character but actually is a letter, numeral, or kana character); 2 denotes free spots; 3 denotes externally contacted spot; and 4 denotes internally-contacted spot.

Figure 3A:
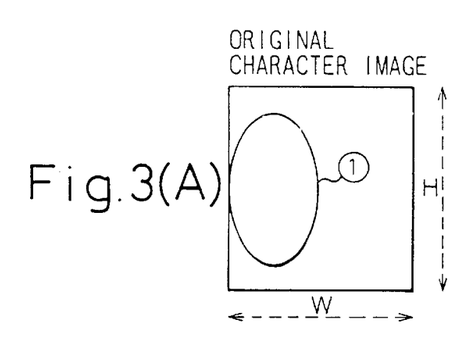
FIGS. 3A to 3E are explanatory diagrams showing the principles of operation according to the present invention.
Figure 3B:
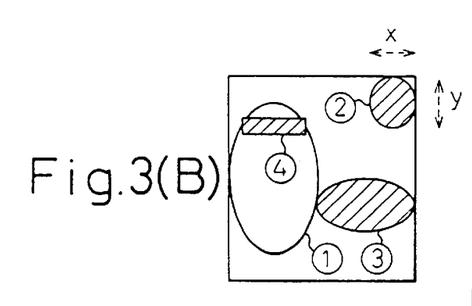

A segmenting unit 3 labels respective bits (dots) representing black pixels in the character image of one character, thus recognizes if the respective bits are connected to vertically-, laterally-, and obliquely-adjoining bits, and then extracts separated masses (segments). In FIG. 3B, a united segment including mutually-connected segments ①, ③, and ④, and a segment ② separated from the segment are extracted.

Figure 3C:
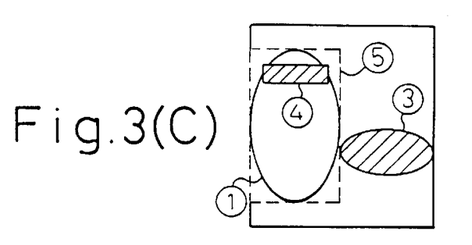

Thereafter, a free spot deleting unit 4 is activated When a type of character (alphabet, numeral, or kana character) to be read is specified, a maximum number of segments is determined. The maximum value is compared with the number of segments provided by the segmenting unit 3. If the number of segments provided is larger, segments having smaller areas are excluded from a plurality of segments (black pixels in the segments to be excluded are changed to white pixels). FIG. 3C shows an example in which at most one type of character (numeral) is to be read, the segment ② has a smaller area than the united segment including the segments ①, ③, and ④, and the segment ② is therefore deleted as free spot.

A character recognition unit 5 collates the character image from which the free spot has been deleted with character patterns stored in a dictionary 9, and thus recognizes a character. At this time, if an output indicating that recognition fails due to spots, an externally contacted spot deleting unit 6 is activated.

The externally contacted spot deleting unit 6 allows a histogram creating means 6a to scan the character image, from which externally contacted spot has been deleted, vertically and horizontally and to create histograms indicating distributions of widths of lined black pixel detected during the respective scans. Next, the externally contacted spot deleting unit 6 allows a circumscribed rectangle creating means 6b to identify a typical black pixel width (width of a black pixel in an original character image) by analyzing the histograms and to create a rectangle circumscribing vertically and horizontally an image having the typical black pixel width. In an example of FIG. 3c, the image having the typical black pixel width is the segment ①. The circumscribed rectangle is a rectangle 5 indicated with a dotted line.

Thereafter, the externally contacted spot deleting means 6c extracts a segment located outside the circumscribed rectangle from the character image (including the segments ①, ③, and ④). In an example of FIG. 3c, the segment ② located outside the rectangle ⑤ is deleted. As a result, the segments within the circumscribed rectangle shown in FIG. 3D remain in the character image.

Figure 3D:
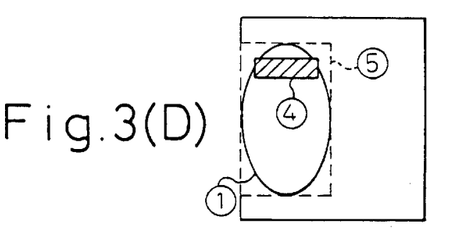

An internally contacted spot deleting unit 7 in the character reader 1 is then driven. A low-resolution image producing means 7a produces a low-resolution image of the remaining character image. A matching means 7b matches the low-resolution image of the character image with the low-resolution patterns of character patterns prepared and provided in the dictionary 9. A character pattern that has the smallest difference from the character image (that is, the highest analogousness or is most analogous with the character image) is selected from the dictionary. The internally contacted spot deleting means 7c then rewrites a location in the low-resolution pattern of the character pattern (in the dictionary) which corresponds to a location in the original-resolution character image associated with an inconsistent location (bit representing a black pixel) in the created low-resolution image of the character image, so that the location represents a white pixel. Thus, internally contacted spot is deleted.

The character recognition unit 5 uses the dictionary 9 to recognize a character in the original-resolution character image from which an internal spot has been deleted.

Figure 3E:
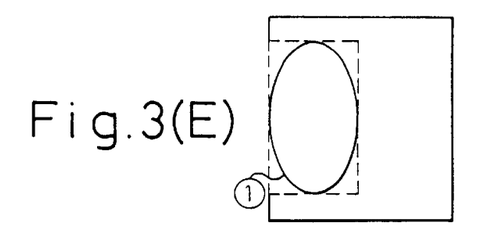

In an example shown in FIG. 3D, the internally contacted spot deleting unit 7 has deleted the internally contacted spot ④ from the character image including the segments ① and ④, and thus provides the original character image as shown in FIG. 3E. Character recognition is then executed.

Figure 4:
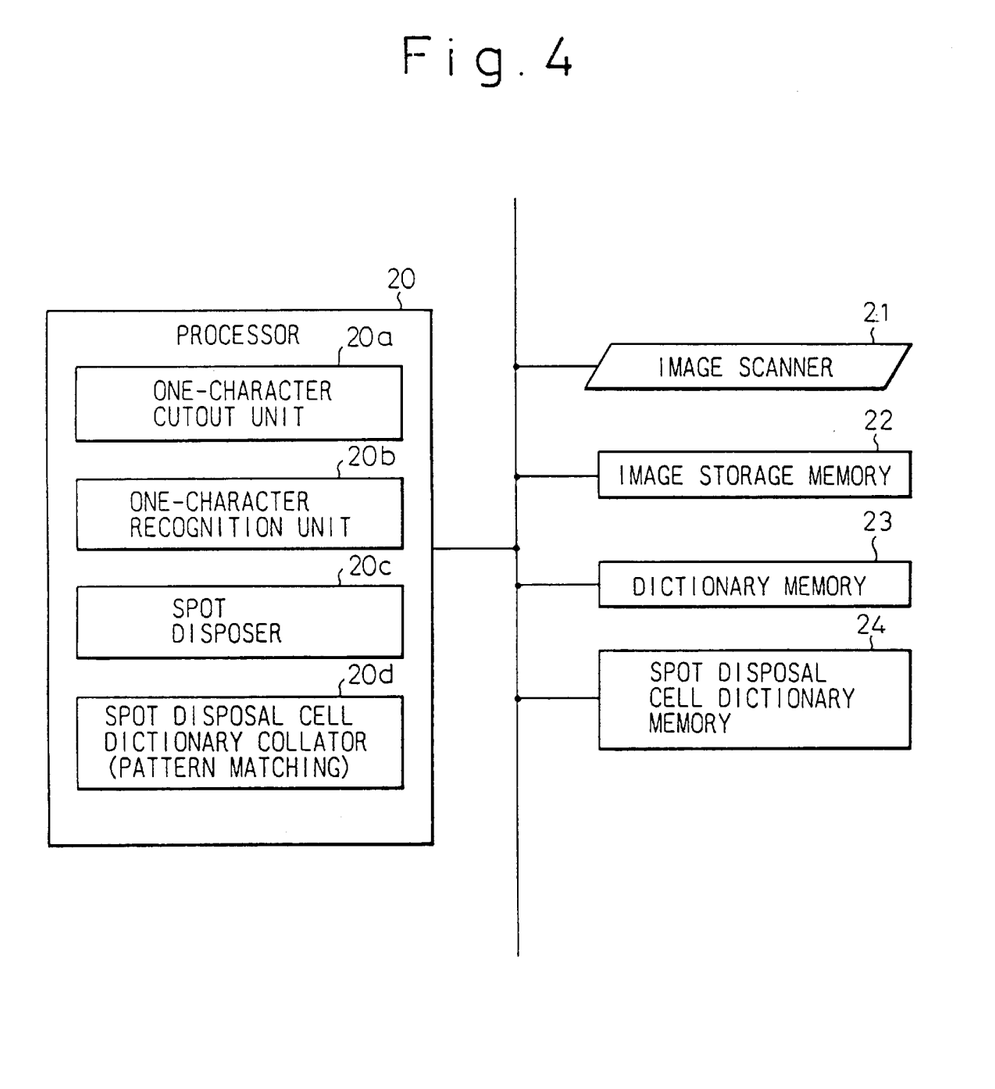
FIG. 4 shows a hardware configuration in an embodiment in FIG. 3, according to the present invention.

FIG. 4 shows a hardware configuration in an embodiment of the present invention. FIGS. 5 to 8 show processing flow charts (parts 1 to 4).

In FIG. 4, reference numeral 20 denotes a processor (including a CPU, a program storage memory, and a work area memory), 21 an image scanner for reading slips, 22 an image storage memory, 23 a dictionary memory for storing character patterns for use in character recognition, and 24 a spot disposal cell dictionary memory for storing low-resolution character patterns of the character patterns in the dictionary memory.

Reference numerals 20a to 20d denote major features implemented as programs in the processor 20; 20a denotes a one-character cutout unit; 20b denotes a one-character. recognition unit; 20c denotes a spot disposer; and 20d denotes a spot disposal cell dictionary collator.

The processing flow chart followed by the processor 20 in a character reader having the aforesaid hardware configuration will be described with reference to the drawings (FIGS. 9 to 11) concerning the respective sequences.

Figure 5:
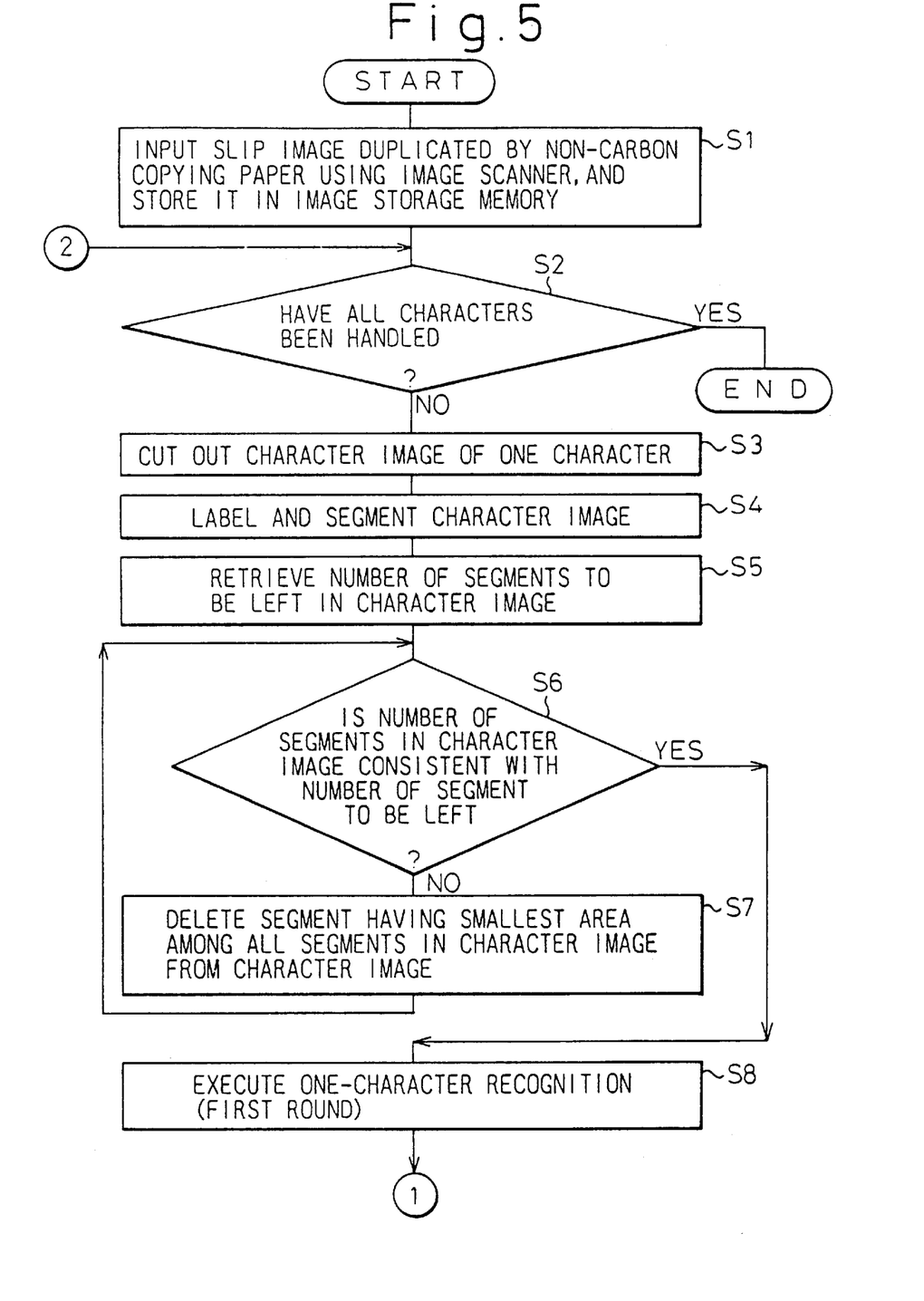
FIG. 5 shows a processing flow chart (part 1) in FIG. 4.

In FIG. 5, a slip image produced by reading a slip duplicated by non-carbon copying paper using the image scanner (21 in FIG. 4) is input and stored in the image storage memory 22 (S1 in FIG. 5). Thereafter, it is checked if the conditions for terminating the sequence are satisfied. Specifically, it is determined whether all characters have been handled (S2 in FIG. 5). If all characters have not been handled, a character image (composed of numerous bits representing black or white pixels) of one character to be handled is cut out from the image storage memory 22 (FIG. 4) (S3 in FIG. 5). Next, the character image is labeled and segmented (S4 in FIG. 5).

Figure 9:
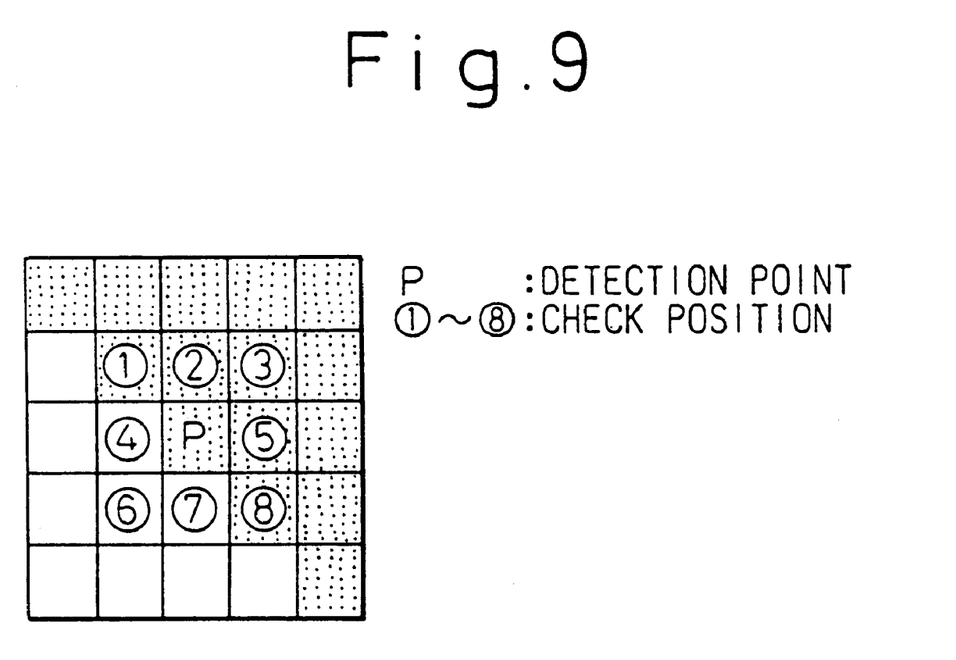
FIG. 9 is an explanatory diagram concerning the conditions for connection check to be performed during labeling.

The conditions for connection check to be performed during the labeling will be described in conjunction with FIG. 9. FIG. 9 shows some pixels (5-by-5 pixels) in the character image. White pixels and black pixels (indicated with dot meshing) are arranged. Labeling is applied sequentially to all black pixels each of which is regarded as a detection point (P). In FIG. 9, a pixel indicated with P is regarded as a detection point. The positions above and below (②and ⑦), right and left (⑤and ④), and oblique (①, ③, ⑥, and ⑧) of the detection point P are defined as check positions. It is then checked if the pixels at the check positions are black. If the pixels ①, ②, ③, ⑤, and ⑧ are black, they are treated as one segment (connected segment). For a slip duplicated by non-carbon copying paper, a character image may be blurred. The conditions for checking if a pixel is connected to others include a connection check in oblique directions as well as a connection check in vertical and lateral directions. This exerts an effect of preventing a segment from being separated due to a blur. During the labeling, the number of segments contained in a character image, and their areas, are calculated. The area is an area of a circumscribed rectangle (height by width) confining a segment therein (x by y in FIG. 3B).

In FIG. 5, the number of segments to be left in the character image is determined (S5). The principles of determining the number of segments will be described in conjunction with explanatory diagrams of FIGS. 10A and 10B concerning the numbers of segments to be left as a character image.

Figure 10A:
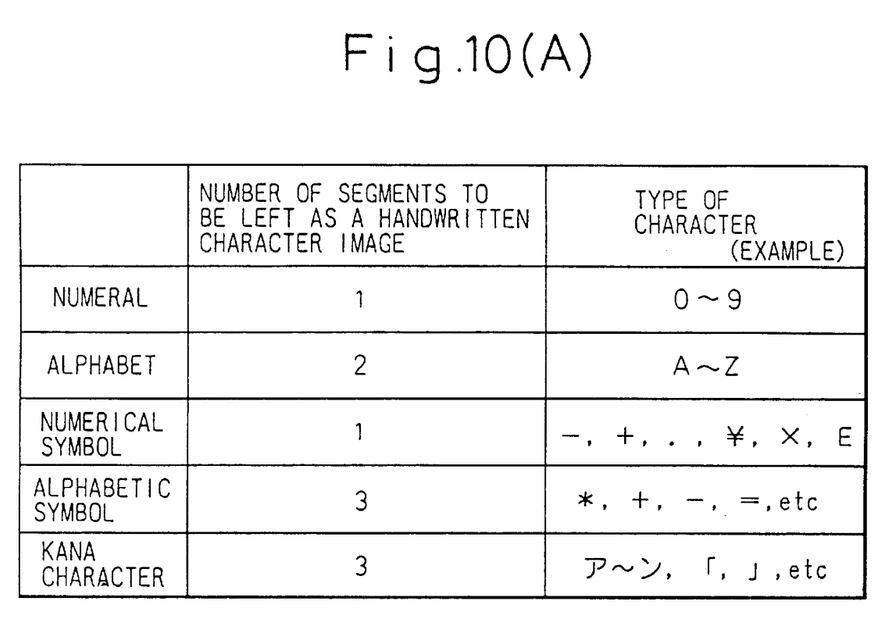
FIGS. 10A and 10B are explanatory diagrams concerning the numbers of segments to be left as a character image.
Figure 10B:
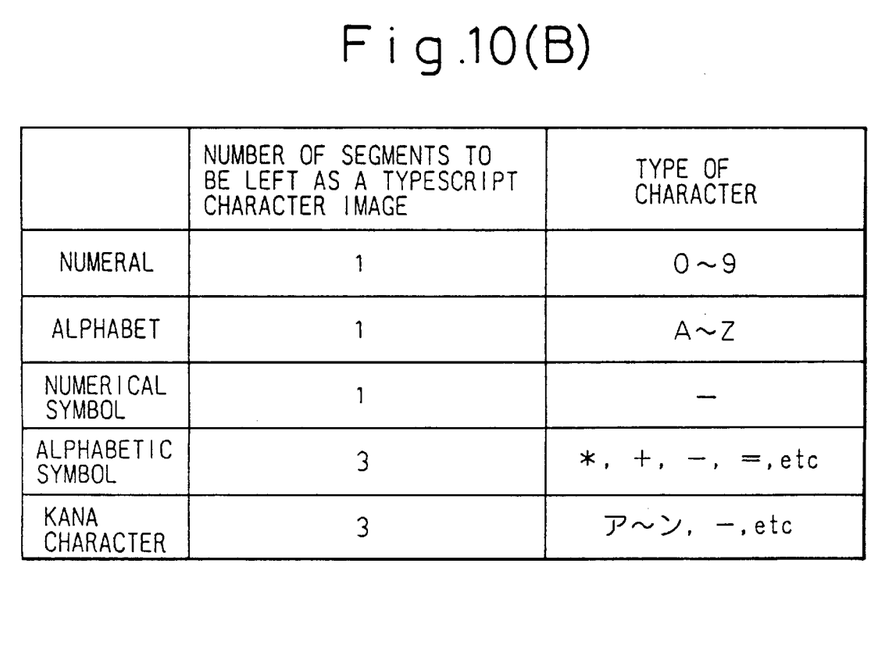

FIG. 10A defines the (maximum) number of segments regarded as handwritten letters, numerals, kana characters, or symbols to be read for each reading attribute (type of characters to be read); that is, letters, numerals, kana characters or symbols. FIG. 10B defines the maximum number of segments regarded as typed letters, numerals, kana characters, or symbols for each reading attribute. In a type of character for which 1 is specified as the number of segments to be left, a character image of a reference character does not contain a separate character image.

A type of character is designated by inputting a reading attribute to the character reader during reading of a slip. Once the numbers of segments associated with types of characters shown in FIGS. 10A and 10B are stored as tables of character attributes, the number of segments to be left can be retrieved merely by referencing the item of the designated type of character in the table.

After the number of segments to be left is retrieved, it is determined whether the number of segments to be left is consistent with the number of segments in a character image (S6 in FIG. 5). If the number of segments in the character image is larger, a segment having the smallest area among all the segments is deleted from the character image (S7 in FIG. 5). In this example, the deleted character image is as shown in FIG. 3C. If the number of segments in the character image is smaller, spot disposal is not executed but one-character recognition is executed, which is not illustrated.

For example, when a character image of a handwritten numeral is handled, the number of segments to be left is 1. When the character image contains two segments or more, it means that a segment that is free spot to be deleted is present. segments are deleted as unnecessary free spot in ascending order of area, starting with the smallest area. Incidentally, segments to be left have larger areas.

If it is determined at step S6 that the number of segments in the character image is the same as the retrieved number of segments to be left, the first round of one-character recognition is executed (S8 in FIG. 5). The one-character recognition is effected by collating a character image with respective character patterns in the dictionary memory 23 (FIG. 4). Next, at step S9 in FIG. 6, it is determined whether the result of the recognition is to be rejected; that is, it is checked whether the recognition fails or succeeds.

In the determination, the certainty (or difference) of a candidate character derived from character recognition is checked and compared with a constant preset for each reading attribute and category (type of character). If the difference is large (or the certainty is low), the candidate character is rejected. If the difference is small, it is determined that no contacted spots exists, and the candidate character is held as the result of recognition (in a memory in the processor). Control is then passed to the sequence for the next character (S10 in FIG. 6).

When the candidate character is rejected, it is determined that the character image contains contacted spots. Contacted spot disposal is then executed at step S11 and thereafter.

Figure 6:
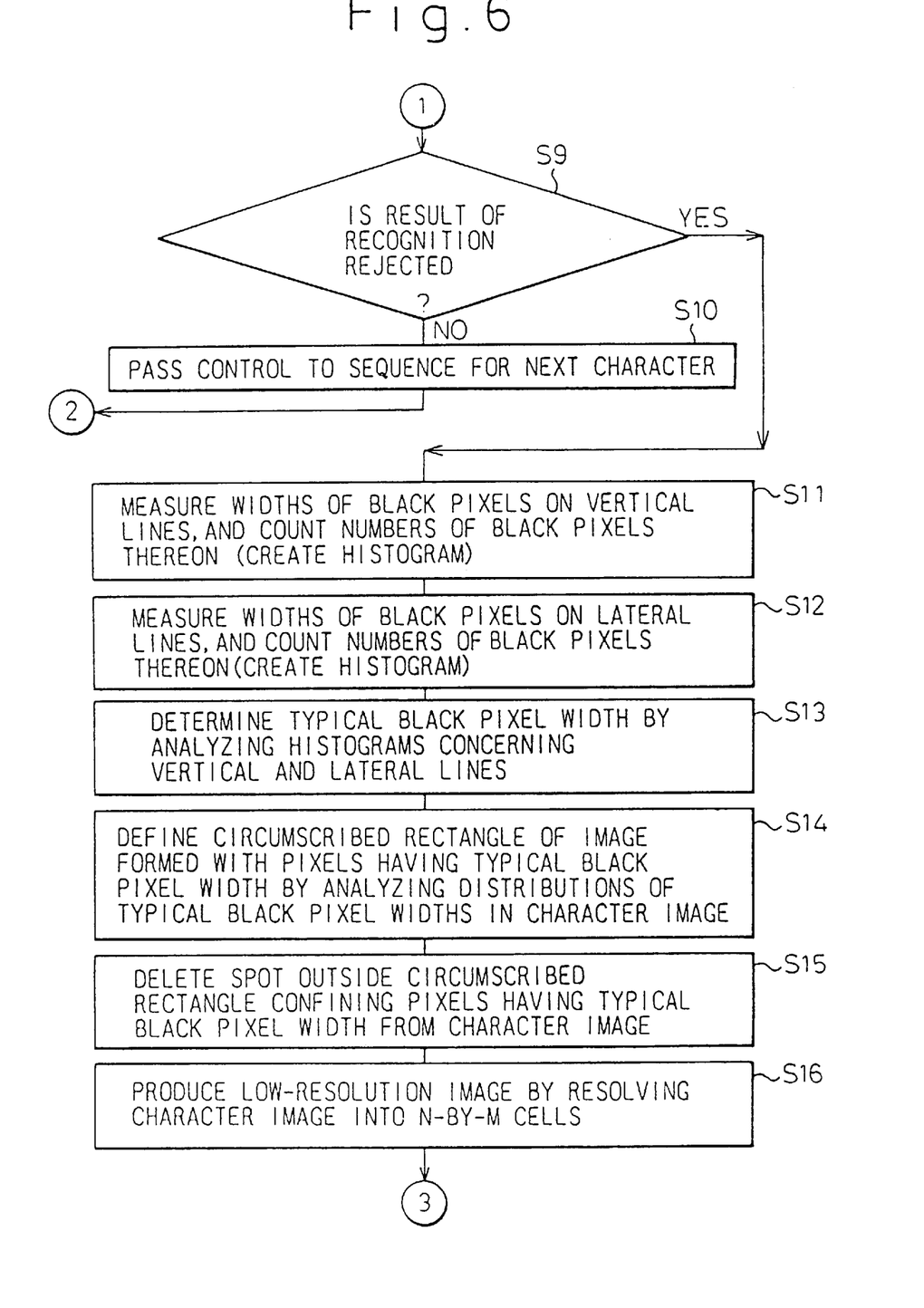
FIG. 6 shows the processing flow chart (part 2) in FIG. 4.

The widths (lengths) of black pixels on vertical lines forming the character image (from which a free spot is deleted) are measured and the numbers of the black pixels on the vertical lines are counted, whereby a histogram is created (S11 in FIG. 6). Next, the widths of black pixels on lateral lines are measured and the numbers of the black pixels on the lateral lines are counted, whereby another histogram is created (S12 in FIG. 6).

Figure 11:
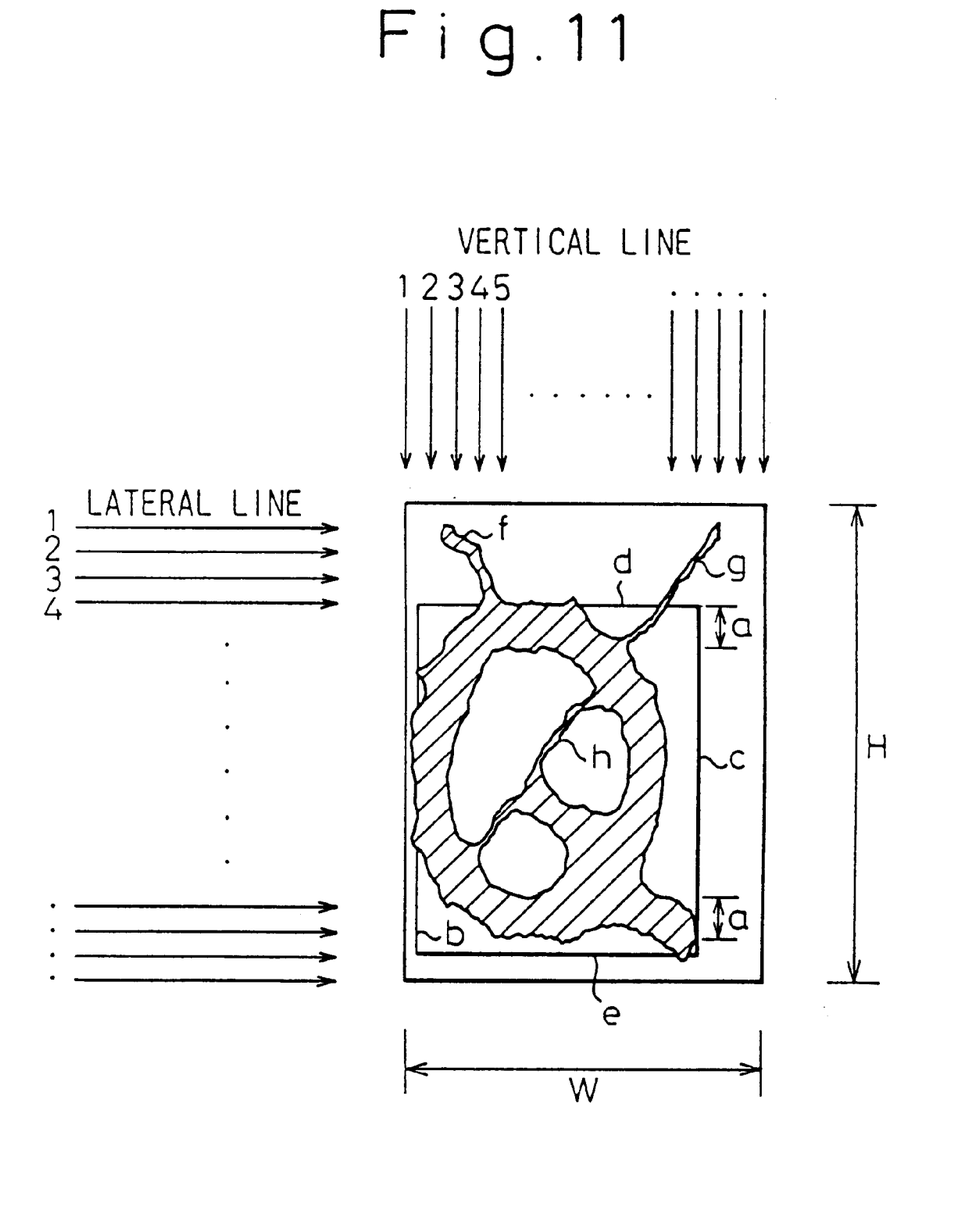
FIG. 11 is an explanatory diagram concerning a procedure of measuring widths of black pixels in a character image.
Figure 12A:
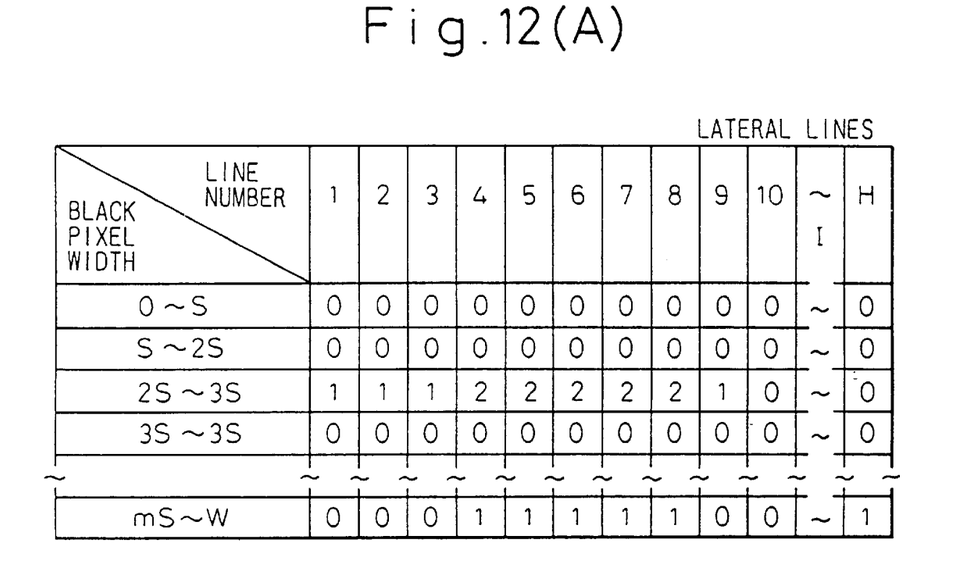
FIGS. 12A and 12B show examples of histograms specifying the widths of black pixels in a character image vs. the number of black pixels.
Figure 12B:
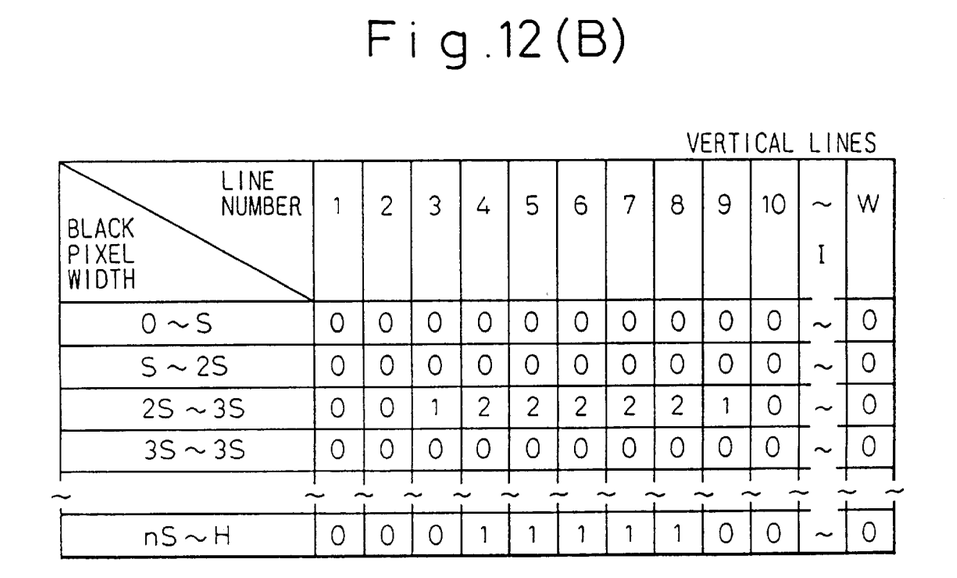

FIG. 11 is an explanatory diagram concerning a procedure of measuring the widths of black pixels in a character image. FIGS. 12A and 12B show examples of histograms specifying the widths of black pixels in a character image vs. the numbers of black pixels. Note that the contents of FIGS. 12A and 12B are not related to the example of a character image in FIG. 11.

A histogram specifying the widths of lines in a character image is created by measuring the widths of black pixels on vertical lines, along which a character image (letter Q) of H high and W wide as shown in FIG. 11 is scanned sequentially by starting the scan with line 1, and by counting the number of black pixels on the vertical lines. In a histogram specifying the widths of black pixels on lateral lines, as shown in FIG. 12A, 0 to S, S to 2S, etc., mS to W indicate ranges of black pixel widths. S is regarded as a reference unit of 1 mm. A maximum width is indicated by H (whole width of a character image). In a histogram concerning vertical lines, as shown in FIG. 12B, the counted number of black pixels is specified for each range of widths. A maximum width is indicated by H (height of a character image).

Back to the sequence in FIG. 6, a typical pixel width is determined by analyzing the histograms concerning vertical lines and lateral lines (S13 in FIG. 6). This determination is made by identifying a range of widths, in which the largest number of pixels are distributed, in each of the histograms. In an example shown in FIGS. 12A and 12B, the typical pixel width ranges from 2S to 3S.

Next, a circumscribed rectangle of the character image is defined according to the distributions of pixels having the typical pixel width (vertical and lateral lines) (S14 in FIG. 6). A spot lying outside the circumscribed rectangle that confines black pixels having the typical pixel width therein is deleted from the character image (S15 in FIG. 6).

In the example of a character image shown in FIG. 11 a width a is detected most frequently and regarded as a typical pixel width. The lengthwise and sideways distributions of the typical pixel width are checked, whereby a circumscribed rectangle of the character image is found to be defined with vertical lines b and c, and lateral lines d and e. Spikes f and g are deleted as external spots outside of the circumscribed rectangle.

Thereafter, the character image from which the external spots of the circumscribed rectangle have been deleted may be subjected to character recognition. In this embodiment, there is a possibility that the character image may have an internally contacted spot. Internal spot disposal is started at step S16.

A low-resolution image is produced by resolving the character image into n-by-m cells (S16 in FIG. 6).

Figure 13:
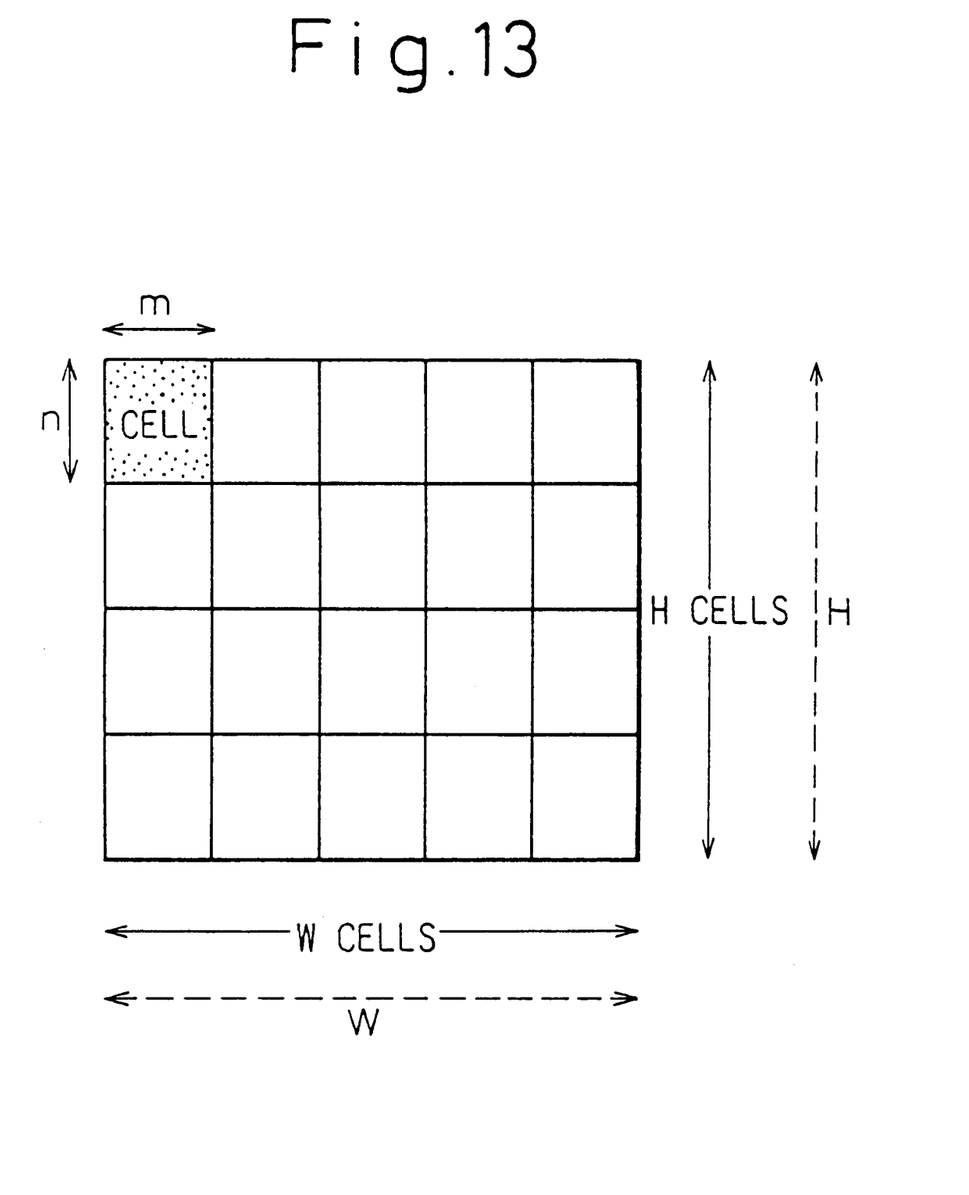
FIG. 13 is an explanatory diagram concerning production of a low-resolution image.

FIG. 13 is an explanatory diagram concerning production of a low-resolution images. In FIG. 13, an original character image has a size of h-by-n bits high and w-by-m bits wide. The character image is resolved into h-by-w cells each having a size of n bits high and m bits wide. Each cell is regarded as one black pixel when any of the original n-by-m bits belonging to the cell represents a black pixel. When a cell does not contain any bit representing a black pixel, the cell is regarded as a white pixel. Thus, a low-resolution image having h-by-w cells is produced.

To be more specific, when a character image:of 32 bits high and 48 bits wide is resolved into cells each having a size of 8 bits high and 8 bits wide. This results in a low-resolution character image composed of 4 cells (height)×6 cells (width)=24 cells.

Figure 7:
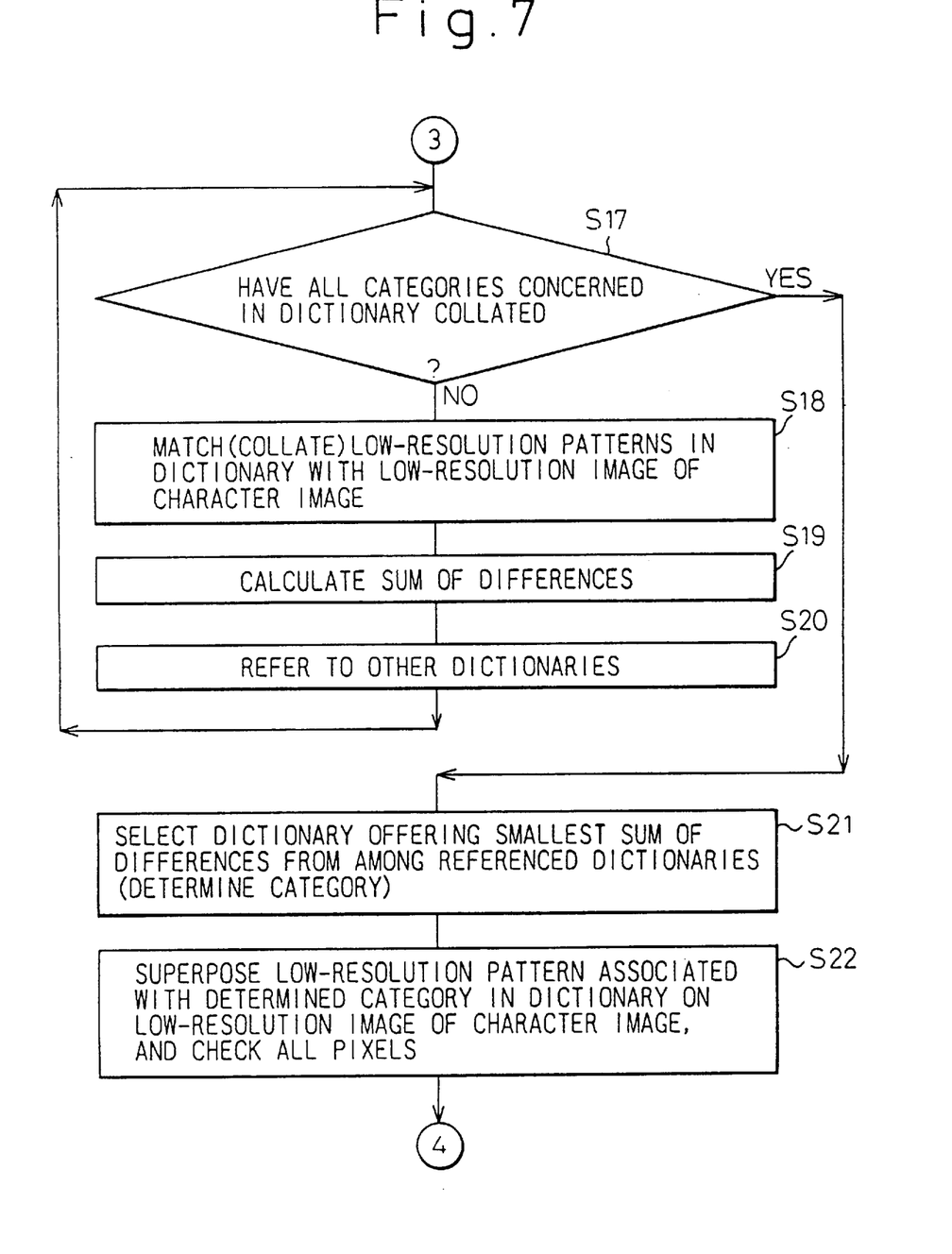
FIG. 7 shows the processing flow chart (part 3) in FIG. 4.
Figure 8:
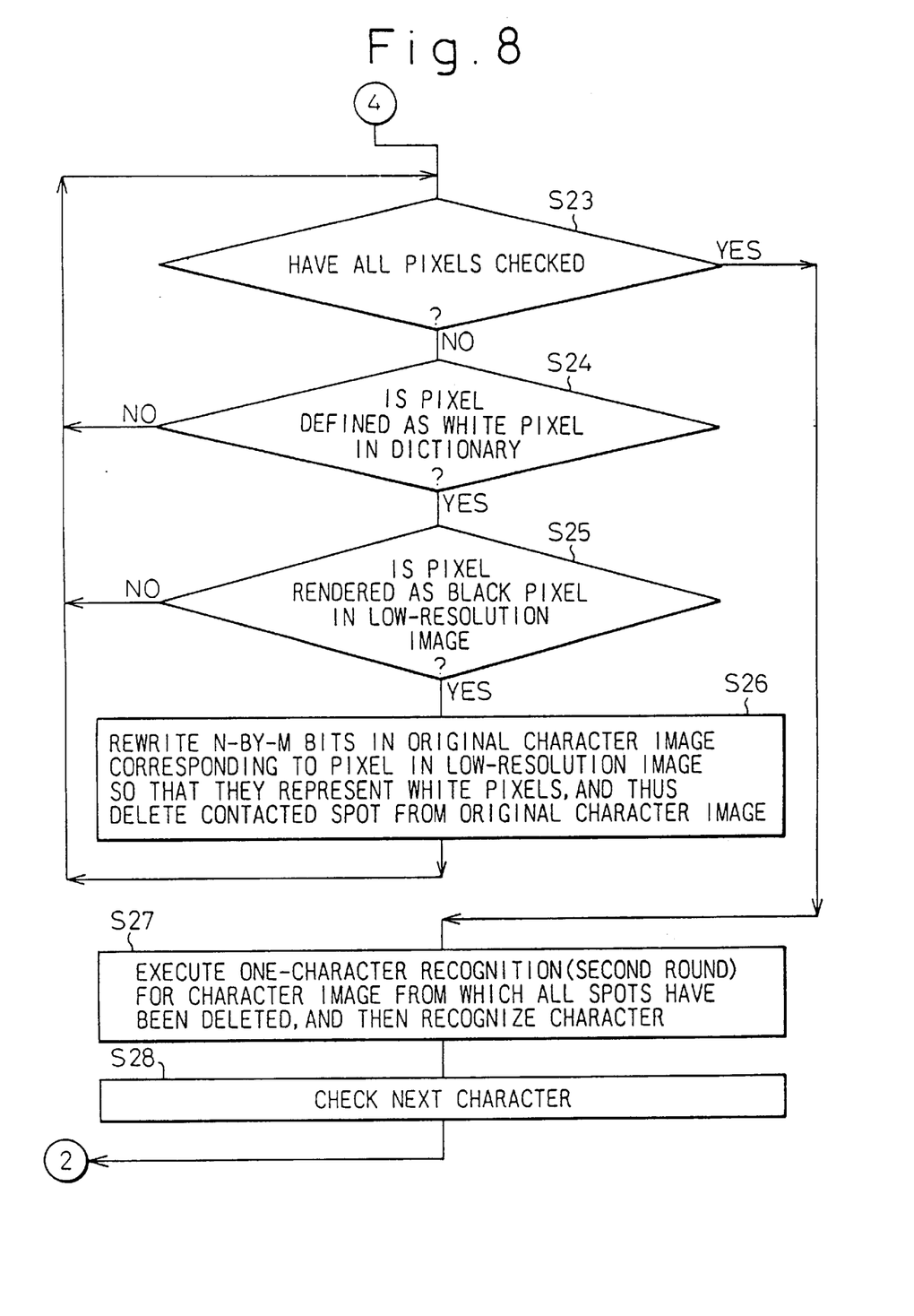
FIG. 8 shows the processing flow chart (part 4) in FIG. 4.

At step S17 in FIG. 7 succeeding step S16 in FIG. 6, it is determined whether all categories in the dictionary have been collated. If collation has not been completed, the low-resolution image of the character image is matched (collated) with character patterns in the spot disposal cell dictionary (S18 in FIG. 7).

The spot disposal cell dictionary will now be described. The spot disposal cell dictionary has numerous categories (N character patterns for each type of character) associated with low-resolution patterns each comprising h-by-w cells and being produced by resolving a character pattern into n-by-m cells. The spot disposal cell dictionary is realized as a spot disposal cell dictionary memory (24 in FIG. 4). A "category" means a character code.

A black pixel or a white pixel is determined with the contents of each bit constructing a cell in an original dictionary memory. Since low-resolution patterns are stored in the spot disposal cell dictionary memory, when a character image having an uncertain size and a possibility of deformation is resolved at a relatively low resolution, the influence of deformation can be alleviated.

The low-resolution image of the read character image is collated with the low-resolution patterns in the spot disposal cell dictionary memory. A sum of differences is then calculated (S19 in FIG. 7). Other dictionaries (other spot disposal cell dictionaries associated with other types of characters) are referenced (S20 in FIG. 7). Pattern matching is then rerun. After all categories concerned have been collated (S17 in FIG. 7), a dictionary offering the smallest sum of differences is selected from among the referenced dictionaries. A category (character code) associated with a candidate character is then determined (S21 in FIG. 7).

Next, the low-resolution pattern of the character pattern associated with the determined category in the dictionary is superposed on the low-resolution image of the character image, so that all pixels can be checked (S22 in FIG. 7). This check sequence is show in FIG. 8. It is determined whether all pixels have been checked (S23 in FIG. 8). If all pixels have not been checked, it is determined whether a pixel to be checked is defined as a white pixel in the dictionary (S24 in FIG. 8). If the pixel to be checked is defined as a black pixel, control is returned to step S23. The next pixel is then checked. if the pixel to be checked is defined as a white pixel, it is determined whether the pixel is rendered as a black pixel in the low-resolution image (of the image to be read) (S25 in FIG. 8). If the result of the determination is in the negative (white pixel), the pixel in the low-resolution image has the same contents as that in the dictionary. The next pixel is then checked (S23 in FIG. 8). if the result of the determination is in the affirmative (black pixel), n-by-m bits in the original character image corresponding to the pixel in the low-resolution image are rewritten to represent white pixels. Thus, the internally contacted spot is deleted from the original character image (S26 in FIG. 8). In the example of FIG. 11, internally contacted spot h is deleted.

Thereafter, control is returned to step S23. The next pixel is checked similarly. When all pixels have been checked, the character image from which all spots have been deleted is subjected to the second round of one-character recognition that is based on the dictionary (in the dictionary memory 23 in FIG. 4). A character is then recognized (S27 in FIG. 8). Thereafter, the next character image is selected (S28 in FIG. 8). Control is returned to step S2 in FIG. 5. The aforesaid processing is restarted. When all character images have been handled, the processing terminates.

I claim:

1. A method for removing spots from character images of a multi-character image read from a slip or document by an image scanner, spots to be removed including a free spot and an externally contacted spot, the method comprising the steps of:

cutting out one character image from the multi-character image;

detecting a number of separated segments in the cut-out character image;

deleting, as the free spot, a segment of the detected, separated segments when the number of detected segments exceeds a maximum segment number determined in accordance with a type of character image;

recognizing a character in the character image from which the free spot has been deleted;

identifying, when the step of recognizing a character fails to recognize a character, a typical black pixel width of lines forming the character by analyzing the distribution of black pixel widths in the character image;

defining a circumscribed rectangle that circumscribes the character in accordance with the typical black pixel width; and deleting, as the externally contacted spot, pixels of images lying outside the circumscribed rectangle from the character image.

2. A method according to claim 1, wherein spots to be removed include an internally contacted spot, and the method further comprises the steps of:

matching the character image from which the externally contacted spot has been removed, with character patterns in a character dictionary;

detecting a bit in the character image inconsistent with an associated bit in the most analogous character pattern of the character patterns; and deleting the internally contacted spot by rewriting the detected bit in the character image.

3. An apparatus for removing spots from character images of a multi-character image read by an image scanner, spots to be removed including a free spot and an externally contacted spot, the apparatus comprising:

a character cutout unit for cutting out one character image from the multi-character image;

a segmenting unit for detecting segments forming the cut-out character image;

a free spot deleting unit for, when the number of detected segments exceeds a maximum value determined for a type of character image to be read, deleting a segment of the detected segments as the free spot;

a character recognition unit for recognizing a character in the character image from which the free spot has been deleted; and an externally contacted spot deleting unit for deleting the externally contacted spot by, when the character recognition unit fails to recognize a character, identifying a typical black pixel width of the line of the character of the image by measuring black pixel widths in the character image, and using a circumscribed rectangle circumscribing the character and defined using black pixels having the typical black pixel width, to delete pixels of images lying outside the circumscribed rectangle as the externally contacted spot.

4. An apparatus according to claim 3, wherein, when the number of segments detected by the segmenting unit exceeds the maximum value, the free spot deleting unit deletes segments sequentially by starting with a segment having the smallest area among the detected segments.

5. An apparatus according to claim 3, wherein the externally contacted spot deleting unit identifies a black pixel width and uses a circumscribed rectangle to delete pixels by detecting black pixel widths on vertical and lateral lines, line by line, creating histograms specifying the number of black pixels existent on the vertical and lateral lines, identifying the typical black pixel width by analyzing the histograms, and detecting vertical and lateral lines that define a circumscribed rectangle confining pixels having the identified pixel width.

6. An apparatus according to claim 3, wherein spots to be removed include an internally contacted spot, and the apparatus further comprises:

an internally contacted spot deleting unit for deleting the internally contacted spot from the character image after the externally contacted spot deleting unit deletes the externally contacted spot, by collating the character image with character patterns in a character dictionary to detect the most analogous character pattern, detecting a bit in the character image inconsistent with an associated bit in the detected character pattern, and rewriting the detected bit.

7. An apparatus according to claim 6, wherein the internally contacted spot deleting unit deletes the internally contacted spot by resolves the character image into cells each having a height of n bits and a width of m bits, produces a low-resolution image composed of the cells, collates the low-resolution image with low-resolution patterns prepared in spot disposal cell dictionaries, and provides a corresponding collation result, detects a location of the internally contacted spot in the character image by analyzing the collation result, and deletes the internally contacted spot.

8. A method for removing spots from character images of a multi-character image read by an image scanner, spots to be removed including free spots and externally contacted spots, the method comprising the steps of:

cutting out one character image from the multi-character image;

deleting free spots, by determining separated segments in the cut-out character image, determining that there is no free spot in the character image when the number of detected segments is less then or equal to a maximum segment number for the character image, determining that there is a free spot in the character image when the number of detected segments exceeds the maximum segment number for the character image, and when it is determined that there is a free spot, deleting a segment of the detected, separated segments as the free spot; and deleting externally contacted spots, by, when it is determined that there is a free spot and the free spot has been deleted, and when a character is not recognizable in the free spot deleted character image, identifying a typical black pixel width of lines forming the character of the character image, circumscribing a rectangle around the character of the character image, the rectangle being defined in accordance with the identified typical black pixel width, and deleting, as an externally contacted spot, pixels lying outside the circumscribed rectangle from the character image.

9. A method according to claim 8, wherein spots to be removed include internally contacted spots, and the method further comprises, when an externally contacted spot has been deleted from the character image, the step of:

deleting internally contacted spots, by matching the externally contacted spot deleted character image with character patterns in a character dictionary, detecting bits in the character image which are inconsistent with corresponding bits in an analogous character pattern of the character patterns, and rewriting the detected bits in the character image.

10. An apparatus for removing spots from character images of a multi-character image read by an image scanner, spots to be removed including free spots and externally contacted spots, the apparatus comprising:

a character cutout unit for cutting out one character image from the multi-character image;

a free spot deleting unit for detecting separated segments in the cut-out character image, determining that there is no free spot in the character image when the number of detected segments is less then or equal to a maximum segment number for the character image, determining that there is a free spot in the character image when the number of detected segments exceeds the maximum segment number for the character image, and when it is determined that there is a free spot, deleting a segment of the detected, separated segments as the free spot; and an externally contacted spot deleting unit for, when it is determined that there is a free spot and the free spot has been deleted, and when a character is not recognizable in free spot deleted character image, identifying a typical black pixel width of lines forming the character of the character image, circumscribing a rectangle around the character of the character image, the rectangle being defined in accordance with the identified typical black pixel width, and deleting, as an externally contacted spot, pixels lying outside the circumscribed rectangle from the character image.

11. An apparatus according to claim 10, wherein, when the free spot deleting unit determines that there is a free spot, the free spot deleting unit deletes segments sequentially by starting with a segment having the smallest area among the detected segments.

12. An apparatus according to claim 10, wherein the externally contacted spot deleting unit identifies a black pixel width and uses a circumscribed rectangle to delete pixels by detecting black pixel widths on vertical and lateral lines, line by line, creating histograms specifying the number of black pixels existent on the vertical and lateral lines, identifying the typical black pixel width by analyzing the histograms, and detecting vertical and lateral lines that define a circumscribed rectangle confining pixels having the identified pixel width.

13. An apparatus according to claim 10, wherein spots to be removed include an internally contacted spot, and the apparatus further comprises:

an internally contacted spot deleting unit for deleting internally contacted spots from the character image after the externally contacted spot deleting unit deletes an externally contacted spot, by collating the character image with character patterns in a character dictionary to detect the most analogous character pattern, detecting a bit in the character image inconsistent with an associated bit in the detected character pattern, and rewriting the detected bit.

* * * * *